United States Patent
Bhat et al.

(10) Patent No.: US 6,279,039 B1
(45) Date of Patent: *Aug. 21, 2001

(54) RESOURCE MANAGEMENT METHOD AND APPARATUS FOR MAXIMIZING MULTIMEDIA PERFORMANCE OF OPEN SYSTEMS

(75) Inventors: Kabekode V. Bhat; Amalesh C.R. Sanku, both of Naperville, IL (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/627,192

(22) Filed: Apr. 3, 1996

(51) Int. Cl.[7] .............................. G06F 13/38; G06F 15/17
(52) U.S. Cl. ............................................ 709/226; 709/229
(58) Field of Search ........................ 395/200.33, 200.47, 395/200.48, 200.49, 200.53, 200.54, 200.56, 200.31, 200.3, 821, 827, 672, 674, 675, 676, 677, 184.01; 709/203, 229, 217, 218, 219, 223, 224, 226, 201, 200, 102, 104, 105, 106, 107; 710/1, 7

(56) References Cited

U.S. PATENT DOCUMENTS

| | | | |
|---|---|---|---|
| 5,321,605 | * 6/1994 | Chapman et al. | 705/7 |
| 5,440,719 | * 8/1995 | Hanes et al. | 395/500 |
| 5,461,611 | * 10/1995 | Drake et al. | 370/420 |
| 5,491,690 | * 2/1996 | Alfonsi et al. | 370/404 |
| 5,550,982 | * 8/1996 | Long et al. | 395/200.49 |
| 5,572,694 | * 11/1996 | Uchino | 395/406 |
| 5,606,359 | * 2/1997 | Youden et al. | 348/7 |
| 5,630,067 | * 5/1997 | Kindell et al. | 395/200.61 |

OTHER PUBLICATIONS

Dogac et al., "A Generalized Expert System for Database Design", IEEE, 1989.*

Chung et al., "A Relational Query Language Interface to a Hierarchical Database Management System," IEEE, 1989.*

Multimedia Laboratory Research Papers, http://www-cse.ucsd.edu/groups/multimedia/papers.html, Jan. 1, 1997.*

The Tenet Group Papers, http://tenet.berkeley.edu/tenet-papers.html, Jan. 1, 1996.*

(List continued on next page.)

Primary Examiner—Mark H. Rinehart
(74) Attorney, Agent, or Firm—Gates & Cooper (57) ABSTRACT

A computer-implemented system performance model based resource management method and apparatus for dynamically guaranteeing delivery of specified constant bit rate multimedia data for a specified duration to each accepted multimedia client request, is disclosed. The method can be executed on any open system server or electronic device that selectively connects upstream multimedia information channels or storage subsystems over a data communication path to an arbitrary number of downstream NTSC ports or devices individually requiring data delivered at a specified bit rate for a specified duration. The method includes dynamically tracking the utilization and capacity of key resources of the server system as they are used by existing clients of the system, receiving and analyzing new requests for their impact if granted upon the performance of the server in servicing the existing clients, and granting the new request only if the analysis shows that such grant will guarantee that the server can simultaneously service the needs of both the new request and the existing clients. An open multimedia server system having an admission controller operating according to the described method is also disclosed.

14 Claims, 2 Drawing Sheets

OTHER PUBLICATIONS

Ferrari, "A New Admission Control Method for Real–time Communication in an Internetwork" i S. Son, Ed., Advances in Real–Time Systems, Ch. 5, pp. 105–116, Prentice–Hall, Englewood Cliffs, NJ, Jan. 1, 1995.*

Gemmell et al., "Multimedia Storage Servers: A Tutorial and Survey", IEEE Computer, Jan. 1, 1995.*

Haskin, R.L., "The Shark continuous–media file server," COMPCON Spring '93. Digest of Papers, IEEE Comput. Soc. Press, 1993, Feb. 1993.*

Vin, H.M. et al., "An Observation–Based Admission Control Algorithm for Multimedia Servers," Proceedings of the International Conference on Multimedia Computing and Systems, IEEE Comput. Soc. Press, pp. 234–243, Jan. 1994.*

Vin, H.M. et al., "A statistical admission control algorithm for multimedia servers," Multimedia 94, ACM, Oct. 1994.*

Chang et al., "An open–systems approach to vidio on demand," IEEE Communications Magazine, May 1994.*

Deloddere et al., "Interactive video on demand," IEEE Communications Magazine, May 1994.*

Liu, C.L. and Layland, J.W., "Schelduling Algorithms for Multiprogramming in a Hard–Real–Time Environment", Journal of the Association for Computing Machinery, vol. 20, No. 1, Jan. 1973, pp. 46–61.*

Ferrari, D. and Verma, D.C., "A scheme for real–time channel establishment in wide–area networks," IEEE Journal on Selected Areas in Communications, vol. 8 Issue 3, pp. 368–379, Apr. 1990.*

Lougher, P. and Shepherd, D., "The design of a storage server for continuous media," The Computer Journal, vol. 36, No. 1, Jan. 1993, pp. 32–42.*

Vin, H.M. and Rangan, P.V., "Designing a multiuser HDTV storage server," IEEE Journal on Selected Areas in Communications, vol. 11, Issue 1, pp. 153–164, Jan. 1993.*

* cited by examiner

RESOURCE MANAGEMENT METHOD AND APPARATUS FOR MAXIMIZING MULTIMEDIA PERFORMANCE OF OPEN SYSTEMS

CROSS-REFERENCE TO RELATED APPLICATION

The disclosures of copending U.S. patent application Ser. No. 08/624,337, entitled "Predictable Diverse Data Delivery Enablement Method and Apparatus for ATM Based Computer System," filed on even date herewith, are herein fully incorporated by reference.

FIELD OF THE INVENTION

The present invention relates generally to multimedia communication systems, and more particularly to a system performance model based resource management system for use with a multimedia server that dynamically guarantees delivery of service to accepted multimedia clients.

DESCRIPTION OF RELATED ART

Multimedia (MM) communication is a high fidelity, high productivity technological means for people to confer or to gather information wherever they are and whenever they are in need, using the media of their choice. It is a technological attempt to emulate the bandwidth, fidelity and effectiveness that are present in a face-to-face communication. The advent of high performance, low cost microprocessors, memory systems, redundant arrays of inexpensive disk storage technology and high bandwidth I/O buses, coupled with the demand for multimedia communication, is resulting in computers being an integral part of global communication systems. With the marriage of advanced technologies of computers and communication networks, people can get information they need in any form when and where they need it. These technologies facilitate activities such as watching a video of one's own choice on demand, or receiving interactive audiovisual instructions for repairing a broken machine from an expert located at a remote site.

The ability to provide a service to customers as agreed and meeting their expectations is vital for success in a competitive business such as communication and computers. In communication arena, ATM technology by design provides quality of service (QOS). QOS here is defined by guarantees on the bandwidth, loss of frames and delay to the network customers. Although considerable research has been done in specific MM areas, the issue of how to provide "guaranteed" quality of service (GQOS) in MM communication involving both computers and communication networks is not completely understood as yet. One method to achieve GQOS is to incorporate an admission control strategy where new jobs will be turned down based on some criteria.

Computers typically are configured to accurately complete specific data processing tasks within an average response time, acceptable to its customer. Understanding the application processing scenario on the system, the performance, capacity and reliability characteristics of the major system components under the processing scenario are adequate to design a good configuration meeting those needs. However, in MM computing, where certain data types such as video or audio must be delivered at the clients at a rate required by them, the traditional approaches are not adequate. In MM applications, accurate delivery of data from the computer to its client alone is not enough; it must be done at a rate needed by the client or meeting the specified deadline.

Users of MM clients (such as desk top computer or other electronic or electromechanical devices) require uninterrupted delivery of MM information to these devices from open servers at a constant bit rate for a specific duration, as needed by the clients. Current open system servers do not have the capability to dynamically guarantee MM data delivery for new service requests. This will either lead to observable failure of service to one or more MM clients of the MM server or substantial underutilization of system resources. The former results in customer dissatisfaction, and the latter in reduced performance/price ratio.

The present invention addresses the above shortcomings of prior art MM communication systems. The methodology presented by the present invention is generally applicable to different configurations of open computer systems and provides a basis for realizing GQOS in MM communication systems.

SUMMARY OF THE INVENTION

To overcome the limitations in the prior art described above, and to overcome other limitations that will become apparent upon reading and understanding the present specification, this invention discloses a computer-implemented system performance model based resource management algorithm and method that dynamically guarantees delivery of specified constant bit rate MM data for specified duration to each accepted MM client request. The system of this invention executes on any open system server (or an electronic device) that is connected to either an MM information storage subsystem (such as disks, RAIDs, optical arrays, etc.) or to an upstream MM information channel and the output channels connected to an arbitrary number of NTSC ports or other devices requiring a specified constant bit rate for a specified duration by means of a data communication path such as bus hierarchy or ATM connections. According to one aspect of the invention, the algorithm embodied in this system enables each of the NTSC ports being fed with constant bit rates of information for a specified time interval from the upstream information sources as desired by the customers. The algorithm is configured to operate in response to an MM server system performance model that predicts the number of streams that the system can dynamically support. The system of this invention enables open system MM servers to guarantee delivery of information to servers dynamically with no buffer overflows or starvation.

According to one implementation of the algorithm of the inventive system, whenever a new service request arrives at the MM server, the system recognizes the constant bit rate needs (based on the characteristics of the client) and the duration for which the client needs the guaranteed continuous service. The system maintains a table or database that dynamically keeps track of the utilization and capacity of key system resources such as the CPU(s), disks, MM data, memory, system bus and data input/output path bandwidths. According to one implementation of the algorithm of the present invention, the following steps are practiced:

(1) If the request is for terminating or cancellation of MM service, the algorithm responds to the request and updates the appropriate table entries (utilization of key resources) reflecting the release of the resources, and then continues to step (5). If it is for a new services request, then proceed to step (2).

(2) From a table look-up, the algorithm checks if key resources are available for the duration. If they are, then proceed to step (3). Otherwise, deny this request as there is no way to meet it, and proceed to step (5).

(3) Determine if granting the request would bottleneck any of the key resources currently being used by existing clients. If the answer is yes, the new request is turned down (since to satisfy the request, one or more users would fail to get service from the server), and step (5) is executed. Otherwise, proceed to step (4).

(4) The algorithm invokes an MM performance prediction model logic using the current values for the model parameters to predict if the system can guarantee the constant bit rate delivery to the new request for the specified period while meeting all the existing performance guarantees for the current users. If the answer is yes, appropriate resources are granted to the new request, and the table entries are updated to reflect the addition of the new user. If the answer is no, the request is turned down (to avoid failure to meet the requirements of one or more users) and step (5) is executed.

(5) Wait for the next request arrival, or completion of service for one of the current users. If a service is successfully completed, then proceed to step (1). If a new request arrives, go to step (2).

BRIEF DESCRIPTION OF THE DRAWING

Referring to the Drawing, wherein like reference designations represent corresponding parts throughout the several views.

DETAILED DESCRIPTION OF THE PREFERRED EMBODIMENT

A meaningful definition for QOS in MM communications must encompass the entire solution architecture rather than be limited to disk I/O or server or network. Taking the lead from business computing and communication arena, it is reasonable for a MM customer to desire: (a) response time for the continuous media requests to be bounded by a reasonable time; and (b) service for all admitted clients to be continuous for a period with the requested quality in terms of Mbit rates, delay and jitter.

The QOS for MM is determined by the response time and data delivery rate at the client. This is influenced by the processing scenario within the system incorporating the information source (e.g. a disk subsystem), network connections from other servers or clients, and the software. GQOS within a system is possible under the following conditions:

1. the system is configured properly meeting the customer's stated needs;
2. admission control is based on current values of (monitored or model predicted) performance parameters for key components and the impact of new request admission on the QOS of new and existing requests; and
3. protection against viruses and misbehaving applications whose resource demands hurt QOS for all.

An obvious solution is to design servers that provide GQOS from their part and couple them with the ATM network that has QOS built by design so that the entire system provides GQOS for MM customers. However, proprietary real time computers are more expensive than off-the-shelf open systems. Further, users might prefer emerging open system computers that include symmetric multiprocessing, highly parallel architectures, operating systems, databases, high availability and other technologies. The present invention provides an approach that enables an open system server to support GQOS.

Admission control has received considerable attention in the art. One proposed technique provides an observation based method that assumes that the average amount of time spent in retrieving a media block from disk does not change significantly even after the new client is admitted by the server. Requiring a disk subsystem operating under this assumption, however, represents a major restriction. In a statistical admission control algorithm, distributions of access times of media blocks from disk and the play-back requirement of streams are used to provide a statistical service guarantee to each client. Such method assumes that occasional loss of media information is acceptable and a percentage of frames that may lead to brief distortions in play back can be discarded. The present invention resolves the shortcomings of such prior art approaches.

The present invention provides an algorithmic method for providing GQOS. A premise of this invention is that once a task is assigned resources, it must be allowed to continue securing GQOS. Each new user request is evaluated to assure that allocating resources to it will not affect the GQOS for the user requests currently being served. This is done by an open queuing network based performance model of the overall MM system. The performance modeling determines the maximum number of streams the entire system can support and the response time for a typical user command for such system. For a discussion and analysis of such performance modeling for an ATM based diverse data enabled server of the general configuration that will be hereinafter described with respect to illustrating practice of the methodology of this invention, the reader is referred to my copending cross-referenced U.S. patent application, Ser. No. 08/624,337 filed on even date herewith and entitled "Predictable Diverse Data Delivery Enablement Method and Apparatus for ATM Based Computer System," which is herein incorporated by reference. The model, incorporated as a software driver, mimics the effect of allocating the resource to the new user request by updating the bandwidths and utilization of relevant components and assures the end-to-end relevant data transfer delays that occur for each of the current users are within the bounds as not to affect the QOS for all users. The present algorithm denies resources to the request if GQOS for the existing users were to be compromised.

In the following description, using graph theory and queuing networks the model and data structures needed by the algorithm of this invention are described. The resource management algorithm of this invention is then developed and its complexity is determined. Application and illustration of the methodology of the algorithm as used in middleware of an MM server system, is then described.

The Graph Theoretic Model

Consider a client-server architecture where a number of client computers are connected to the server via both ATM and local area networks (LAN). The server can be a uni-processor or multiprocessor system that has a large disk farm, a number of ATM OC-3 interfaces that serve clients over the ATM network. The server ATM connections are assumed to be ordered (from 1 to n) as are the major components such as the CPU memory subsystem and I/O buses, disk drives, media content resources (or streams of data) etc. A client user, "client (ij)" is the j-th client associated with the i-th ATM connection to the server.

We associate a graph G={V, E} with the MM communication system where V denotes the vertex set and E the edge set. The edge set E represents the set of all major components (ordered in some fashion) of the system where a significant transmission delay or utilization occurs during the system operation. Relevant system components modeled include the CPUs (both server and clients), buses, disk subsystems, intelligent interfaces to buses, LAN and WAN network links and switches and all software, middleware and firmware required for operating the entire system. An edge (u,v)∈E, u,v ∈V, if and only if (u,v) is a component of the system.

For u,v∈V, a walk from u to v in G is a sequence of edges $\{e_1, e_2, \ldots e_k\}$ where $e_1$ is incident to u, $e_k$ is incident to v, and consecutive edges have a vertex in common. A path is a walk where each edge appears only once. The client(ij) can be accessed by the server CPU via two alternate paths namely $\Gamma_{ij}$ and $A_{ij}$. The former is for the LAN connection from the client(ij) to the server and the later is for the ATM network connection.

When a request (such as read data, exit, pause or resume) from client(ij) arrives at the server CPU via the path $\Gamma_{rj}$, the path $A_{ij}$ from CPU complex to the client and the path $\Pi_{ij}$ from CPU to appropriate disk are uniquely defined from the overall system topology. The path information from clients to server and the server to stream storage are kept in path tables constructed at system configuration time. An address translation table that provides the mapping of corresponding client addresses to be used for ATM and the LAN drivers is also built at that time. Thus for any client, the two drivers can uniquely figure out the data paths and components visited by the data transfers effected by the drivers.

Streams are numbered and mapped to disks where they are stored. A stream is active if it is assigned to a client, and the data stored in the disk is being moved to the client. An active stream is denoted by the paid (client(ij), stream_number).

A component can be of type-1 or type-2 or type-3. Type-1 are passive links such as the bus, type-2 are CPUs and type-3 are storage devices within the system. Associated with each component (u,v) ∈ E, T(u,v), and C(u,v) respectively denote the type and capacity of the component. C(u,v) is measured in megabytes (MB) per second for type-1, in CPU seconds for type-2, and in gigabytes (GB) for type-3 components. U(u,v) denotes the utilization of component (u,v) based on existing user workload. A new user service request when granted increases the utilization U(u,v) to U'(u,v) only if the new user data visits the component (u,v) at least once within the processing scenario, and the following holds true:

$$U'(u,v) = U(u, v) + \Delta(u, v) \quad (1)$$

where, Δ(u,v)=(request service time in seconds at component (u,v))/C(u,v) for type-2 component and (MB/second data rate in (u,v))/C(u,v) for the type-1 component as the case may be. For each (u,v) ∈ E that is not visited by the data within the processing scenario, Δ(u,v)=0.

List $L_a$ has all active streams at any time. The i-th entry in the array Avail[] is true if stream numbered i is available for assignment, and is false if already assigned to some client. Associated with E, we have three vectors U, U', and V each of dimension |E|, the entries of first two are initialized to 0 at the system boot time. Vector C stores the capacities of each key component at the system configuration time. These vectors are used to manipulate the utilization of the components in E to mimic the behavior of the system. Entries threshold(u,v) and deadline(ij) are used to initialize the maximum utilization permitted for component (u,v) and maximum delay permitted by client(ij) respectively. Two lists $L_c$ and $L_s$ (initially empty) are used to keep track of current list of active users and active streams. With these data structures, component utilization, end to end delays, and relevant response times are computed each time a user request is serviced.

The algorithm uses function delay(active stream) that accepts an active stream (client(ij), stream_no) as argument and returns the expected delay for the transfer of data of requested size from disk storage to client(ij). This delay is obtained by summing up the latencies the data experiences at all components along the data path from the disk to the client. As described in the papers to K. V. Bhat, "Performance Modeling and Analysis for AT&T 3416 Based Multimedia Server Architecture", *Proceedings of International Conference on Telecommunications* 95, PP 1–8, April 1995; and K. V. Bhat, "Performance and Guaranteed Quality of Service for AT&T Multimedia Communication Server", *Proceedings of Symposium on Multimedia Communications and Video Coding*, New York, Oct. 11–13, 1995, and as also described in my cross-referenced copending patent application, the following queuing network model (used extensively in analyzing computer system performance) computes delays at each of the components.

$$\text{component } (u, v) \text{ delay} = \frac{\text{service time at } (u, v)}{(1 - U(u, v))} \quad (2)$$

The function delay(client(ij), stream_no) is implemented by the following:

$$(u, v) = \sum_{e \pi_{ij}, A_{ij}} \left( \frac{\text{service time at } (u, v)}{(1 - U(u, v))} \right) \quad (3)$$

Based on the component performance characteristics, the service time at each component for specific data chunk is known (from laboratory measurements or vendor supplied design parameter values) for a given system. The utilization U(u,v) for each component is computed dynamically by the algorithm, deadline(ij) denotes the maximum delay tolerated by client(ij) before its QOS is violated and threshold(u,v) denotes the maximum utilization permitted for component (u,v) from performance and delay considerations. These parameter values can be computed by the model for specific processing scenario on an architecture as indicated in [2]. Each request from client(ij) provides a request_vector (client(ij), type, stream_number, start, size, Mbit_rate) to the algorithm indicating the client, request type (e.g., get data from stream number xxx at offset yyy of size zzz MBytes at rate rrr MBits/second, exit, pause or resume) being made. R is the response time cut-off for a request acceptable to the user. R is the sum of the time it takes the client request to appear at the server CPU (denoted by input_latency) and the delay(client, stream_no). Input_latency can also be determined by a queuing model. For simplicity, it can be assumed that this delay is bounded by 0.1 seconds, which is reasonable.

The Algorithm and Its Complexity

The following description sets forth the algorithm incorporated by a preferred embodiment of the present invention. The algorithm uses the following three procedures: Wait(), Current_user(), and Admission_control().

```
Algorithm:
    Procedure Wait( )/* wait for the next request */
        While (true) do begin
            If (request=false) then do Wait( )
            Else do begin
                Get request_vector (client(ij), type,
                    stream_no, start, size, Mbit_rate)
                If (client(ij) ∈ L_c) then do
                current_user( )
                /*execute the current_user( ) module */
                Else do admission_control( )/* A new
                    client request requires
                    admission_control. */
            End
        End
End
```

Procedure Current_user()
    If (type=exit) then do being /*Reclaim all the resources
        used by the exiting user.*/
        avail [stream_no]=true
        Delete client(ij) from $L_c$
        Delete (client(ij), stream_no) from $L_a$
        For each (u,v) ∈ $\Pi_{ij}$, $A_{ij}$ do begin /*Update utilization
            reflecting the release of resources.*/
            U(u,v)=U(u,v)−Δ(u,v)
        End
    End
    If (type=pause) then do begin /*If it is for a Pause,*/
        For each (u,v) ∈ $\Pi_{ij}$, $A_{ij}$, do begin\* Update utilization
            reflecting the release of resources.*/
            U(u,v)=U(u,v)−Δ(u,v)
        End
    End
    If (type=resume) then do begin/*If resume,*/
        Admission_control()\* allocate next data chunk through
            admission control.*/
    End
    If (type=data) then do begin/* For active client data request,
    issue disk read and wait.*/
        Read (stream_number, start, size,buffer(ij))
        Wait()
    End
End/* of Current user()
Procedure Admission_control()/* Both new and resumed
clients will be admitted only via this module.*/
    If ((avail [stream_]=false) & (client(ij)−∈ $L_c$))
        then do\* If the stream_no is unavailable,
        Error(1)\* deny the request and send error condition(1)
            to the new client(ij).
        Wait()
    End
    Else do begin\* Assess the consequence of admission on
    bandwidth utilization and latencies.*/
        For each (u,v) ∈ $\Pi_{ij}$, $A_{ij}$ do begin/* Check if affected
            components bottleneck.*/
            U'(u,v)=U(u,v)+Δ(u,v)
            If (U'(u,v)>threshold(u,v)) then do begin\*If a component
                bottlenecks,*/
                Error(2)\*send error condition(2) to the client(IJ)
                & deny the request*
                Wait()
            End
        End
        For each (u,v) ∈ $\Pi_{ij}$ $A_{ij}$ do begin/*Assume admission and
            verify latency*/
            U(u,v)=U'(u,v)/*Revise utilization of components.*/
        End
        If (client (ij), stream_no)−∈ $L_a$) then include client(ij) in
            $L_a$/*Include new client in $L_a$*/
    End
    For each (client(x,y), stream_no) ∈ $L_a$ do begin if ((delay
    (client (x,y), stream_no)>deadline(x,y))|(delay(client(x,y),
    stream_no)+input_latency>R))
        then do begin/*If QOS for existing streams were to suffer,
            on admission of client(ij),*/
        Error(3) /*send error condition(3) to client(ij), deny the
            request*/
        For each (u,v) ∈ $\Pi_{ij}$, $A_{ij}$ do begin
            U(u,v)=U(u,v)−Δ(u,v)/*Reclaim respective bandwidth
                assignments.*/
            Remove client(ij) from $L_a$
            Wait()
        End
    End
    Do begin/*Admit client(ij), Update utilization, issue disk
    read and wait for next request.*/
        If (client(ij)−∈ $L_c$) then do begin
            Include client(ij) in $L_c$/*Include client(ij) in current
                user list*/
        End
        Read (stream_no,start,size,buffer(ij))
        Wait()
    End
End/*of admission_control()*/
End/*end of Algorithm.*/

The following assertions are then made.

Assertion. The Algorithm works correctly and its complexity is linear in terms of the number of streams.

The procedure Wait() keeps looking for any input requests. If there is one, it secures the request_vector, executes the current_user() module or admission_control depending on whether the client is new one or existing one. The current_user() tests the request type. If the type=exit, accounts for the release of resources used by the exiting user, deletes the client from $L_c$ and marks the stream_no as available. If type=pause, the utilization of appropriate components are updated to reflect the release of the resources used by the paused user. If type=resume, then the admission_control() is invoked so that QOS for existing users is not compromised. If the type=data, the required data is read from appropriate disks and sent to the client.

If Wait() encounters a request that is not from $L_c$ then admission_control is invoked. If the requested stream is unavailable the module turns down the request and waits for the next request. Otherwise, it checks if allocating resources to the user would exceed bandwidth utilization of any resource beyond an acceptable threshold. If it does, admission is denied and Wait() executed. Otherwise, the module verifies if resource allocation to the user will violate any of the end-to-end latency and response time requirements for all existing users including the current candidate. If there are no violations, the user is allocated resources and the data needed is read from the disks for the client. If there were a violation, the request is denied and all data structures are updated to reflect the accurate situation.

Updating utilization of affected components (edges) takes O(length of the path from a client to the disk via the server). The decision to grant resources, in the worst case, requires computing the end to end delays for all active streams and this takes, O(number of active streams×length of the path from a client to the disk via the server) operations which is linear in terms of the number of active streams. Thus the algorithm is efficient.

Illustration of the Methodology

Illustration of the methodology of the algorithm of this invention can be had with reference to its application with an MM server network. The method of this invention is to provide GQOS by use of an intelligent middleware in the server system that accurately predicts the consequences of all inputs to the system from the users of the system (or lack of it), and takes appropriate action to assure that all users currently receiving quality service including the new one (if admitted) will continue to do so until completion. As shown above, the algorithm used for admission control in the server system is founded on the system level behavior of the entire MM communication system as given by an accurate model. The model is first validated by actual laboratory measurement and is then embedded within the middleware in the MM server.

Figure 1:
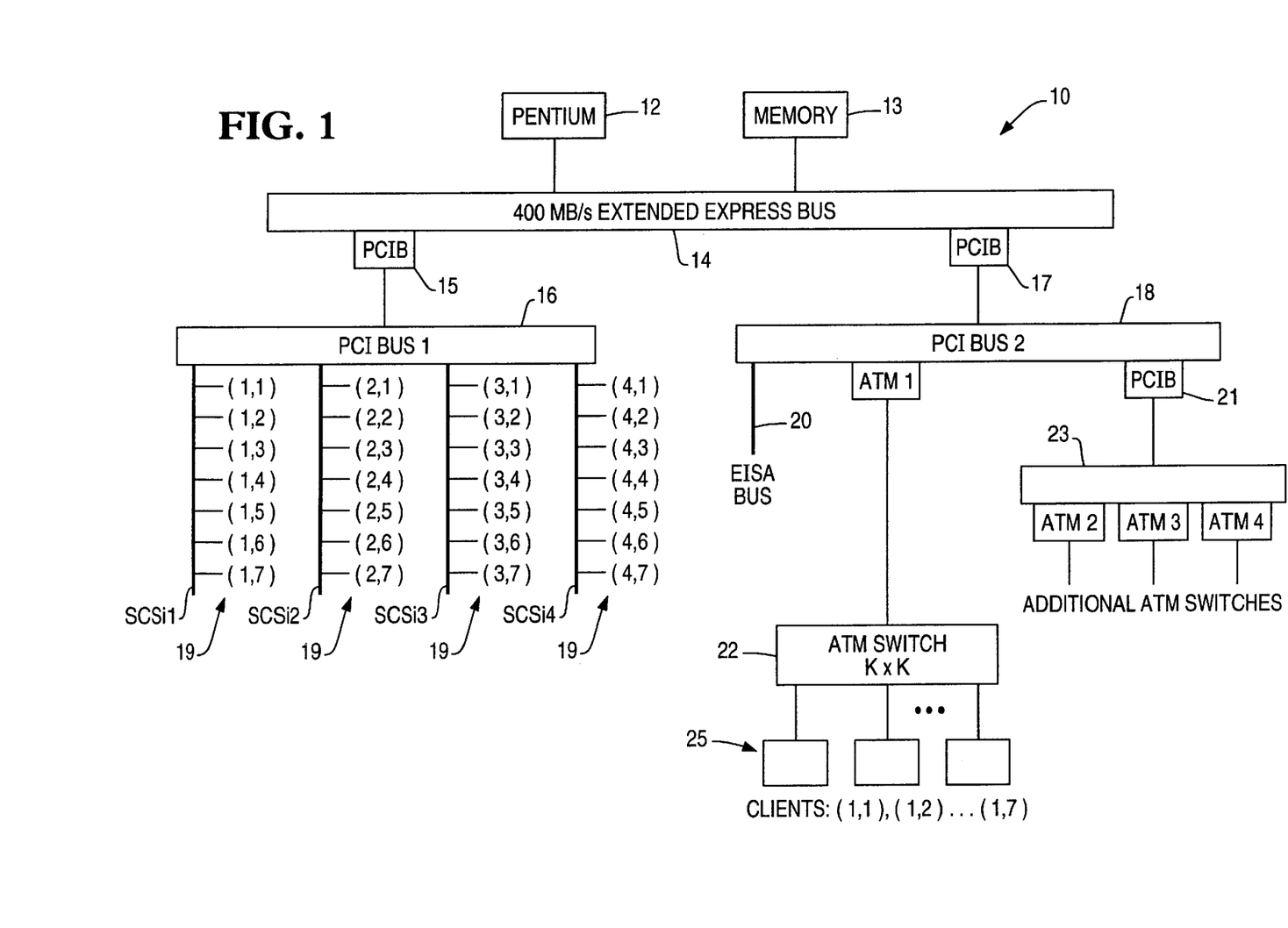
FIG. 1 diagrammatically illustrates on embodiment of a multimedia system to which the present invention can be applied.

For illustration purposes, a multiprocessor MM server manufactured by AT&T under the model name Globalyst S40 will be used, as illustrated at 10 FIG. 1. The server generally has one or more processors 12, memory 13, and a 400 MB/second processor memory bus 14 to which are connected 2 PCI buses labelled pci bus 1 (16) and pci bus 2 (18) by means of pci bridges 15 and 17 respectively. pci bus 1 supports four fast and wide SCSI-2 buses ordered as scsi1, scsi2, scsi3 and scsi4 each of which support seven disks (generally indicated at 19) that are numbered from 1 to 7 for each of the scsi buses. From the system view, the disks are ordered by an integer pair (ij). Thus, disk(ij) denotes the j-th disk in i-th bus. Bus 18 supports ATM connections directly (described in more detail below), and Ethernet connection(s) via the EISA bus 20 as shown in FIG. 1.

Figure 2:
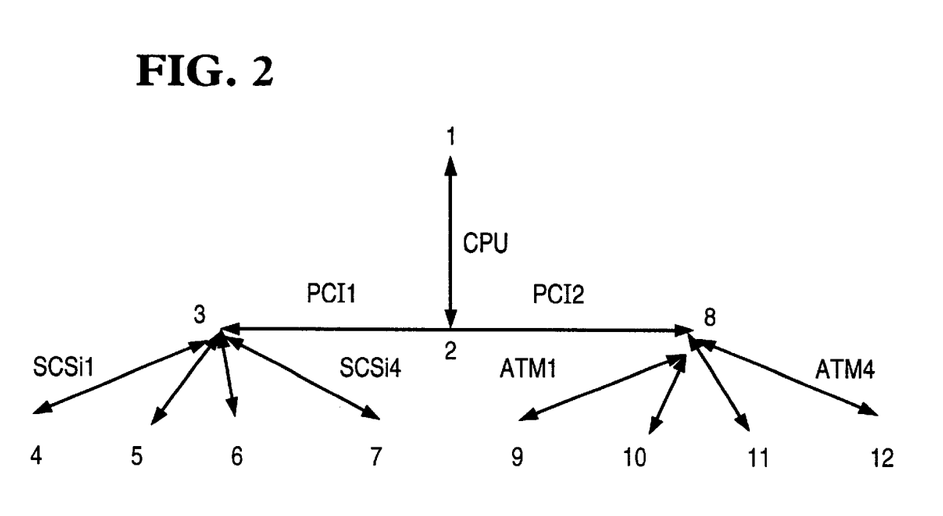
FIG. 2 diagrammatically illustrates the dominant resource graph associated with the system of FIG. 1.

The ATM boards are labelled as atm1, atm2, atm3, and atm4. ATM boards atm2, atm3 and atm4 are connected to another pci bus 23 by means of a pci bridge 21. Each ATM board supports 7 clients (generally indicated at 25) numbered 1 to 7 via an ATM switch (only one of which is shown at 22). An integer pair (ij), where i stands for the ATM board number and j stands for the client number within the group of clients serviced by the ATM board i, uniquely identifies a client in the system. The clients are also served by one or more Ethernets (not illustrated) supported on the EISA bus. The major components of the system modeled are: CPU (includes CPU-memory bus complex), pci1, pci2, scsi1, scsi2, scsi3, and scsi4, {disk(ij): i=1,2,3,4 and j=1,2,3,4,5,6,7}, {client(ij): i=1,2,3,4 and j=1,2,3,4,5,6,7}, and the dominant resource graph associated with the system is shown in FIG. 2.

Assume that there are 56 streams (ordered from 1 to 56) and these are assigned to consecutive disks where each disk holds contiguous data for 2 streams. Thus streams 1 and 2 are stored in disk (1,1), stream 13 and 14 in disk (1,7) . . . and streams 55 and 56 are stored in disk (4,7) respectively. With this organization, given a stream number, the disk where it is stored can be uniquely determined by the disk driver.

TABLE 1

Path Table from the CPU to storage

|  | cpu | pci1 | scsi1 | scsi2 | scsi3 | scsi4 | d(1,1) | d(1,2) | d(1,7) | d(4,6) | d(4,7) |
|---|---|---|---|---|---|---|---|---|---|---|---|
| stream1 | 1 | 1 | 1 | 0 | 0 | 0 | 1 | 0 | 0 | 0 | 0 |
| stream2 | 1 | 1 | 1 | 0 | 0 | 0 | 1 | 0 | 0 | 0 | 0 |
| stream3 | 1 | 1 | 1 | 0 | 0 | 0 | 0 | 1 | 0 | 0 | 0 |
|  | 1 | 1 |  |  |  |  | 0 |  |  |  | 0 |
| stream54 | 1 | 1 | 0 | 0 | 0 | 1 | 0 | 0 | 0 | 1 | 0 |
| stream55 | 1 | 1 | 0 | 0 | 0 | 1 | 0 | 0 | 0 | 0 | 1 |
| stream56 | 1 | 1 | 0 | 0 | 0 | 1 | 0 | 0 | 0 | 0 | 1 |

Table 1 shows part of the path matrix from the CPU to the client disk storage. The 1's in the i-th row define the components that will be in the path from the CPU to the disk storing stream-i. Thus, stream1 is stored in disk(1,1) and the path to access this will have CPU, pci1, and scsi1. Data transfer path for stream54 has CPU, pci1, and scsi4.

The path matrix (or an equivalent list) is constructed from the system topology and populated when data is initially stored on the disks. Similarly, Table 2 is the path matrix from the CPU to ATM boards. Thus the data path from CPU to client(2,1) has CPU, pci2, and atm2, whereas that to client (4,6) will have CPU, pci2, and atm4. These matrices are dependent on both architecture and configuration.

The algorithm uses the Tables for dynamically updating the utilization of key system resources. The avail[] vector in this case has 56 entries that are initialized to true. The delay at the ATM network will not be explicitly modeled since it is about 0.5 millisecond and is negligible. Delays at the clients are assumed to be bounded by a constant depending upon the type of client. For clients of known characteristics, delay at the client can be modeled in the same manner as has been done for the server.

TABLE 2

Path Table from CPU to ATM Network

|  | cpu | pci2 | atm1 | atm2 | atm3 | atm4 |
|---|---|---|---|---|---|---|
| client(1,1) | 1 | 1 | 1 | 0 | 0 | 0 |
| client(1,2) | 1 | 1 | 1 | 0 | 0 | 0 |
|  | 1 | 1 | 1 | 0 | 0 | 0 |
| client(1,7) | 1 | 1 | 1 | 0 | 0 | 0 |
| client(2,1) | 1 | 1 | 0 | 1 | 0 | 0 |
| client(2,2) | 1 | 1 | 0 | 1 | 0 | 0 |
|  | 1 | 1 |  |  |  | 0 |
|  | 1 | 1 |  |  |  | 0 |
| client(4,1) | 1 | 1 | 0 | 0 | 0 | 1 |
|  | 1 | 1 | 0 | 0 | 0 | 1 |
| client(4,6) | 1 | 1 | 0 | 0 | 0 | 1 |
| client(4,7) | 1 | 1 | 0 | 0 | 0 | 1 |

In order to illustrate the algorithm, at some instant, assume that Avail[54]=true or stream 54 is available. Further utilization $U(1,2)=0.3$, $U(2,3)=0.15$, $U(3,7)=0.2$, $U(2,8)=0.15$, $U(8,12)=0.1$. Let the capacities of these components be $C(1,2)=1.0$, $C(2,3)=80$, $C(3,7)=14$, $C(2,8)=80$, $C(8,12)=19$.

Now assume that client(4,6) logs on via LAN and requests the server to playback stream 54. The input_latency here is assumed to be 0.1 second. Procedure Wait() receives the request_vector (client(4,6), type, 54, 0, 1 Megabyte, 8 MBits/second). On seeing that the user is not in $L_c$, the algorithm invokes new-user(). Since Avail[54]=true, and the client needs 1 MB of data at the rate of 8 Mbits/second, the algorithm assures that the data path has adequate bandwidth to serve this client without violating the bandwidth needs of existing clients.

Assuming that the application processing and operating system overhead at the server is about 0.0662 seconds for processing the request at the server, potential updated server utilization would be U'(1,2)=0.3+0.0622=0.3622. The other relevant expected utilization are: U'(2,3)=0.15+1/C(2,3)= 0.15+0.0125=0.1625, and U'(3,7)=0.2+1/14=0.271, U'(2,8)= 0.1625, U(8,12)=0.1+1/19=0.1526. Assuming threshold() for all components are set at 0.9, and deadline for all clients to be 0.2 second, the algorithm will test if delay(client(4, 6),54)>deadline. Using equation (3), the major delays sum up to 0.19 seconds. If the deadline were 0.2 second, the algorithm proceeds with testing if the end to end delay for the existing clients get violated in a similar manner using the utilization and capacities and service times associated with the affected components.

Assuming none of the deadlines and response time requirements are violated, the algorithm assigns the stream 54 to client(4,6), sets Avail[54]=false, includes the pair in $L_a$ and updates U(1,2)=0.3622, U(2,3)=0.1625, U(3,7)=0.271, U(2,8)=0.1625, U(8,12)=0.1526 and includes the client(4,6) in $L_c$. Next it issues a read from the disk[4,6] beginning at offset) a data chunk of size 1 MB and waits for the next request.

Suppose the next request were request_vector (client(2, 1), exit, 1, 0, 1 Megabyte, 8 MBits/second). Client(2,1) wants to exit its session with stream 1. The algorithm recognizes this as a current user request and executes Procedure Current_user, finds that the type is exit, reduces the utilization of the major components along the data path from disk(1,1) to client(2,1) namely: U(3,4), U(2,3), U(1,2) U(2,8) and U(8,9) by appropriate amount. The algorithm also removes the client(2,1) from $L_c$ and the assignment pair (client(2,1),1) from $L_a$. If the previous request were a pause instead of exit, the algorithm executes all steps as in exit except removing the assignment and the user from $L_a$ and $L_c$ respectively.

Accordingly, an efficient methodology for MM communication to provide GQOS for MM clients in terms of letting existing users continue service without disruption with acceptable response time has been demonstrated. This invention implements a model technology directed admission control algorithm to accurately predict the impact of every decision made on user requests on the QOS of both existing and new users in real time. The algorithm of the preferred embodiment just described currently considers only requests for playback, pause, and exit but can be extended for other requests such as fast forward or backup/rewind, etc.

The methodology of this invention has been illustrated for a system that requests all data at the same rate, but can also be applied to systems having scenarios where different clients may request data at different rates and may have different response time needs. The approach would also be of interest where the same client may seek different data rates during an interactive session. Yet another scenario is where the previous scenarios are combined with broadcasting facility.

Algorithms can also be configured within the scope of this invention that take into account some of the parallelism that may exist within the architecture. By accurately accounting for the existing parallelism into the underlying architecture, it may be possible to refine the results further. Another variation of the invention may be to use it in association with the model-directed heuristic rules for specific architectures that would provide GQOS with fewer computations but may lead to near optimal results. The algorithm of the invention can also be fine-tuned for specific architectures by using measured parameters for the model. Alternatively the algorithm can use actually monitored utilization (instead of computing them) in the model if appropriate hardware monitors and software counters are built in the architecture.

It will be appreciated that the various applications, programs, computer processes and other supporting software (e.g., the operating systems and interfaces) are resident at different times on one or more "program storage devices." As used herein, the term "program storage device" may include any device or apparatus capable of storing information such as data or program code either in a volatile or nonvolatile manner. Accordingly, a program storage device may comprise memory devices such as RAMs, ROMs, EPROMs, processor and cache memories, flash memories, customized integrated circuits, etc., as well as fixed or removable mass storage medias such as magnetic disks (fixed or removable), CD-ROMs, magnetic tape, etc. In addition, it will be appreciated that the various applications, programs, computer processes and other supporting software (generically "program products") may be transferred or downloaded to a computer system via network or modem in lieu of being provided on a storage media such as a floppy disk or CD-ROM, typically by first establishing a connection between the computer system and a server-type computer, and thereafter transmitting the program product to the computer system. Thus, it will be appreciated that a "program storage device" may also include any of the aforementioned memory and storage media of a server-type computer (e.g., a bulletin board or ftp site) which downloads or transfers a program product to other computer systems but does not actually execute the downloaded or transferred program product.

The foregoing description of the preferred embodiment of the invention has been presented for the purpose of illustration and description. It is not intended to be exhaustive of or to limit the invention to the precise form disclosed. Many modifications and variations are possible in light of the above teachings. It is intended that the scope of the invention be limited not by this detailed description, but rather by the claims appended hereto.

What is claimed is:

1. A resource management method for an open multimedia system that selectively connects upstream ports over a data communication path to an arbitrary number of downstream ports individually requiring data delivered at a specified bit rate for a specified duration, the method being implemented by a server computer, comprising the steps of:

(a) dynamically tracking utilization and capacity of key resources of the multimedia system on a real time basis for existing clients being serviced through said downstream ports;

(b) receiving a new request for use of said key resources of said multimedia system from a client through one of said downstream ports;

(c) dynamically analyzing the impact of granting said new request on the performance of said server computer in servicing said existing clients and on the new request, including the step of using a performance model of said multimedia system, wherein said model includes matrices of data stream paths through said multimedia system between said upstream ports and said downstream ports; and (d) granting said new request only if said analysis shows that said server computer can simultaneously service the needs of the new request and the existing clients.

2. The method of claim 1, wherein the upstream ports terminate at multimedia information channels and storage subsystems.

3. The method of claim 1, wherein the step of tracking utilization and capacity of key resources is performed by maintaining a database for such purposes.

4. The method of claim 3, further including the step of maintaining and updating said database to reflect changes in utilization and capacity of said key resources as said new requests are granted and as key resources needs for existing clients are terminated.

5. The method of claim 1, wherein the step of analyzing the impact of granting the new request includes the step of assessing the new request to determine said key resources needed to service the new request.

6. The method of claim 5, wherein said assessing step includes:
(a) identifying those of said key resources needed;
(b) determining the duration of time said identified key resources will be needed; and
(c) determining the bit rate requirements for said new request.

7. The method of claim 1, wherein said performance model comprises an open queuing network based performance model of the multimedia system.

8. The method of claim 1, wherein said performance model is used for predicting the maximum number of data streams the entire multimedia system can support and the response time for a typical client user command for the system.

9. The method of claim 1, wherein the analyzing step includes determining whether granting of the new request will bottleneck any of said key resources currently being used by said existing clients.

10. The method of claim 1, wherein the analyzing step includes determining the utilization needs for said key resources required to satisfy said new request, and evaluating whether addition of such determined new request utilization needs for said key resources to real time utilization of those key resources as a result of servicing said existing clients exceeds maximum capacity parameters for such key resources.

11. An open multimedia system comprising:
(a) a bus system for forming data communication paths between an upstream portion terminating at multimedia information channels or storage subsystems and a downstream portion terminating at downstream ports or devices of the type requiring data delivery at a specified bit rate for a specified duration; and
(b) a server computer having a processor and memory, operatively connected with said bus system for controlling data flow through said data communication paths; said server computer receiving new requests for access to said bus system from clients connected to said downstream portion of said bus system and grants or denies said new requests for access in response to real time utilization and capacity of key resources of the multimedia system, wherein the server computer acts according to process steps that:
(1) dynamically track utilization and capacity in real time of said key resources of the multimedia system;
(2) receive said new requests;
(3) dynamically analyzes the impact of granting said new request on capabilities of said key resources based on said real time utilization of said key resources by previously accepted requests in combination with said new request, including a step that uses a performance model of said multimedia system, wherein said model includes matrices of data stream paths through said bus system between said upstream portion and said downstream portion;
(4) grants said new request only if capacities of said key resources will not be exceeded by simultaneous servicing of said new request and current servicing of previously accepted requests; and
(5) wherein guaranteed quality of service is provided to any client connected to the downstream portion of said bus system whose request for access has been granted.

12. A program storage device readable by a computer of an open multimedia system of the type that selectively connects upstream multimedia information channels or storage subsystems over a data communication path to an arbitrary number of downstream ports or devices individually requiring data delivered at a specified bit rate for a specified duration, the program storage device tangibly embodying a program of instructions executable by the multimedia server system computer to manage signal flow through the data communication path, the program comprising:
(a) dynamically tracking utilization and capacity of key resources of the multimedia system on a real time basis for existing clients being serviced through said downstream ports;
(b) receiving a new request for use of said key resources of said multimedia system from a client through one of said downstream ports;
(c) dynamically analyzing the impact of granting said new request on the performance of said server computer in servicing said existing clients and on the new request, including the step of using a performance model of said multimedia system, wherein said model includes matrices of data stream paths through said multimedia system between said upstream ports and said downstream ports; and
(d) granting said new request only if said analysis shows that said server computer can simultaneously service the needs of the new request and the existing clients.

13. The program storage device as recited in claim 12, wherein the analyzing step of said program further includes: determining the utilization needs for said key resources required to satisfy said new request; and evaluating whether addition of such determined new request utilization needs for said key resources to real time utilization of those key resources as a result of servicing said existing clients, exceeds maximum capacity parameters for such key resources.

14. The program storage device as recited in claim 12, wherein said performance model is used to predict the maximum number of data streams the entire multimedia system can support and the response time for a typical client user command for the multimedia system.

* * * * *